US012594953B2

(12) United States Patent
Omi

(10) Patent No.: US 12,594,953 B2
(45) Date of Patent: Apr. 7, 2026

(54) DRIVER MONITOR, METHOD, AND COMPUTER PROGRAM FOR MONITORING DRIVER

(71) Applicants: TOYOTA JIDOSHA KABUSHIKI KAISHA, Toyota (JP); AISIN CORPORATION, Kariya Aichi (JP)

(72) Inventor: Takuhiro Omi, Anjo (JP)

(73) Assignees: TOYOTA JIDOSHA KABUSHIKI KAISHA, Toyota (JP); AISIN CORPORATION, Kariya (JP)

( * ) Notice: Subject to any disclaimer, the term of this patent is extended or adjusted under 35 U.S.C. 154(b) by 53 days.

(21) Appl. No.: 18/433,935

(22) Filed: Feb. 6, 2024

(65) Prior Publication Data

US 2024/0262380 A1     Aug. 8, 2024

(30) Foreign Application Priority Data

Feb. 8, 2023     (JP) ................................. 2023-017728

(51) Int. Cl.
| *B60W 50/16* | (2020.01) |
| *B60W 40/08* | (2012.01) |
| *B60W 50/14* | (2020.01) |
| *B60W 60/00* | (2020.01) |
| *G06V 20/59* | (2022.01) |
(Continued)

(52) U.S. Cl.
CPC ............ *B60W 50/16* (2013.01); *B60W 40/08* (2013.01); *B60W 60/0053* (2020.02); *B60W 60/0057* (2020.02); *G06V 20/597* (2022.01); *G06V 40/161* (2022.01); *G06V 40/18* (2022.01); *B60W 2040/0827* (2013.01); *B60W*

*2050/143* (2013.01); *B60W 2050/146* (2013.01); *B60W 2420/403* (2013.01); *B60W 2520/14* (2013.01);
(Continued)

(58) Field of Classification Search
CPC ............ B60W 50/16; B60W 60/0057; B60W 60/0053; B60W 40/08; G06V 20/597; G06V 40/161; G06V 40/18
USPC ........................................................ 340/576
See application file for complete search history.

(56) References Cited

U.S. PATENT DOCUMENTS

| 2017/0106876 A1* | 4/2017 | Gordon ............. B60W 60/0059 |
| 2017/0261981 A1* | 9/2017 | Ichikawa ............ B60W 50/082 |
(Continued)

FOREIGN PATENT DOCUMENTS

| CN | 111985328 A | * 11/2020 ............. G06F 18/24 |
| JP | 2011-164712 A | 8/2011 |
(Continued)

*Primary Examiner* — Kam Wan Ma
(74) *Attorney, Agent, or Firm* — Dinsmore & Shohl LLP

(57) ABSTRACT

A driver monitor includes a processor configured to detect orientation of the face of a driver of a vehicle from a plurality of driver images generated by a camera mounted on the vehicle to take a picture of the driver, determine whether a duration during which the orientation of the driver's face inclines more than a predetermined angle in a yaw direction of the vehicle with respect to a reference direction is not less than a predetermined time threshold, when the vehicle is under autonomous driving control, notify a transition demand for taking over driving of the vehicle to the driver via a notification device when the duration is less than the predetermined time threshold, and omit to notify the transition demand to the driver when the duration is not less than the predetermined time threshold.

6 Claims, 5 Drawing Sheets

(51) Int. Cl.
    G06V 40/16         (2022.01)
    G06V 40/18         (2022.01)
(52) U.S. Cl.
    CPC . *B60W 2540/223* (2020.02); *B60W 2540/225*
            (2020.02); *B60W 2540/229* (2020.02)

(56)                     References Cited

U.S. PATENT DOCUMENTS

| | | | |
|---|---|---|---|
| 2017/0313319 A1* | 11/2017 | Kishi ................... | B60W 40/08 |
| 2018/0118219 A1* | 5/2018 | Hiei ...................... | B60W 50/14 |
| 2018/0345980 A1 | 12/2018 | Morita et al. | |
| 2019/0065873 A1* | 2/2019 | Wang .................. | G06V 40/168 |

FOREIGN PATENT DOCUMENTS

| | | |
|---|---|---|
| JP | 2017-157196 A | 9/2017 |
| WO | 2020/188788 A1 | 9/2020 |

* cited by examiner

FIG. 3

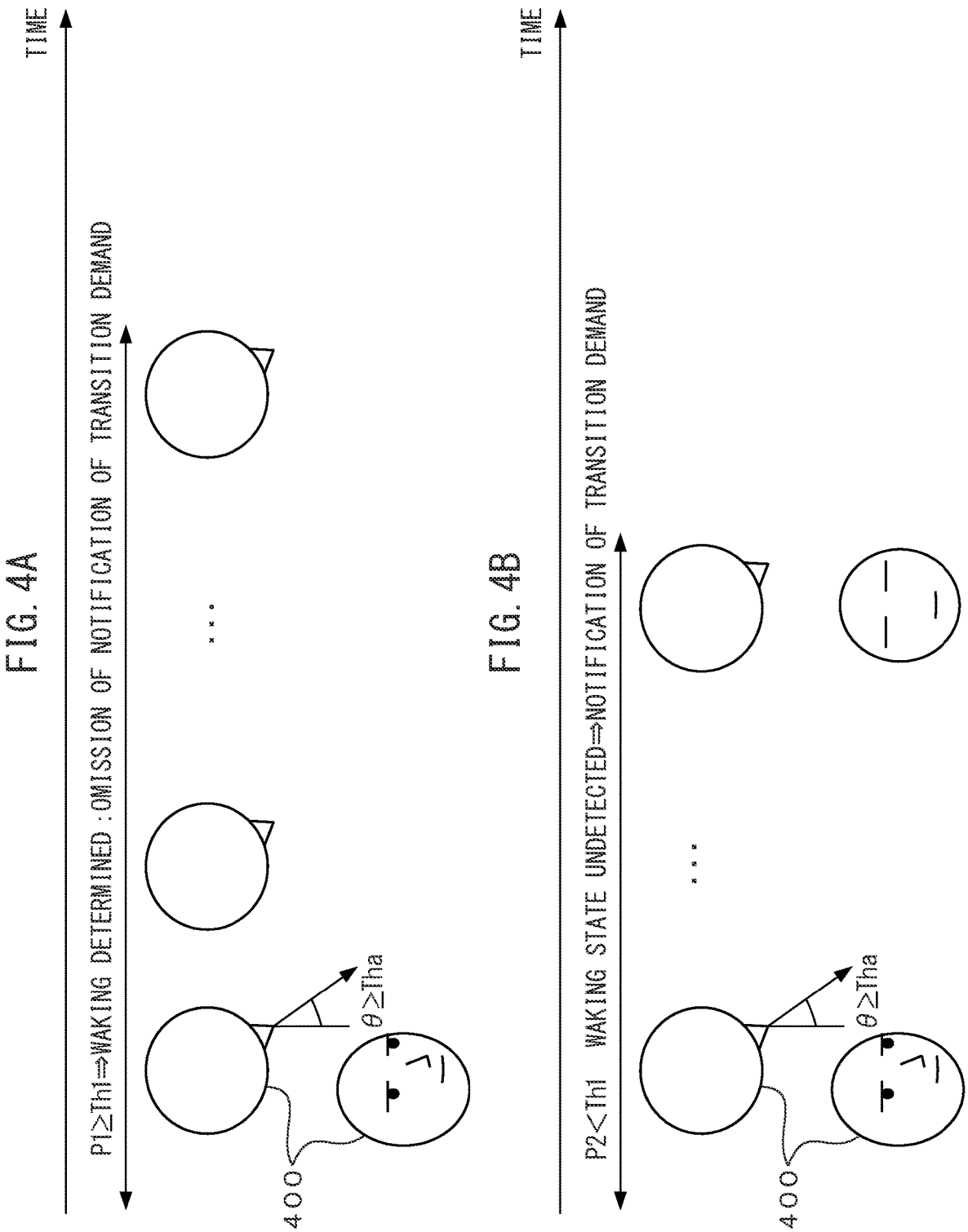

FIG. 5

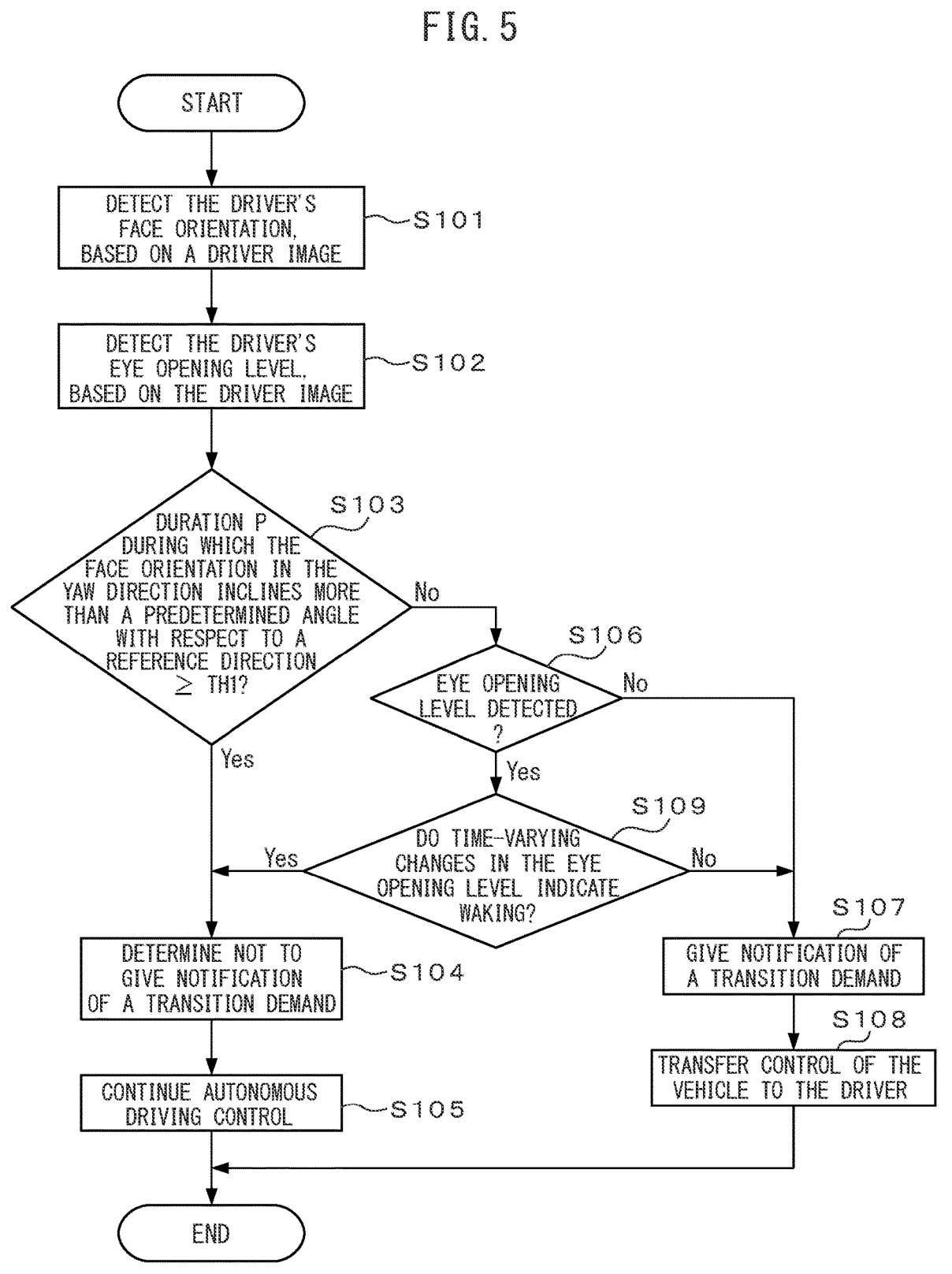

START

DETECT THE DRIVER'S
FACE ORIENTATION,
BASED ON A DRIVER IMAGE                    S101

DETECT THE DRIVER'S
EYE OPENING LEVEL,
BASED ON THE DRIVER IMAGE                  S102

DURATION P
DURING WHICH THE
FACE ORIENTATION IN THE
YAW DIRECTION INCLINES MORE
THAN A PREDETERMINED ANGLE
WITH RESPECT TO A
REFERENCE DIRECTION
≥ TH1?                                     S103

No

EYE OPENING
LEVEL DETECTED
?                                          S106

No

Yes

DO TIME-VARYING
CHANGES IN THE EYE
OPENING LEVEL INDICATE
WAKING?                                    S109

Yes

No

Yes

DETERMINE NOT TO
GIVE NOTIFICATION
OF A TRANSITION DEMAND                     S104

GIVE NOTIFICATION OF
A TRANSITION DEMAND                        S107

S108

TRANSFER CONTROL OF THE
VEHICLE TO THE DRIVER

CONTINUE AUTONOMOUS
DRIVING CONTROL                            S105

END

DRIVER MONITOR, METHOD, AND COMPUTER PROGRAM FOR MONITORING DRIVER

CROSS-REFERENCE TO RELATED APPLICATIONS

This application claims priority to Japanese Patent Application No. 2023-017728 filed on Feb. 8, 2023, the entire contents of which are herein incorporated by reference.

FIELD

The present disclosure relates to a driver monitor, a method, and a computer program for monitoring a driver of a vehicle.

BACKGROUND

Techniques have been proposed to determine whether a driver of a vehicle is in a state suitable for driving the vehicle by monitoring the driver (see Japanese Unexamined Patent Publications JP2011-164712A and JP2017-157196A).

An inattentive driving alarm disclosed in JP2011-164712A determines whether a driver's gazing or looking aside is based on turning only his/her eyes (eye-turned gaze) or turning his/her face (face-turned gaze). The inattentive driving alarm determines that the driver is gazing at a specific object, when the looking direction or the face orientation has been within a gaze direction range stored in a storage unit over a gaze determination time. Further, the inattentive driving alarm determines that the driver is looking aside, when the looking direction or the face orientation has been within a side direction range stored in the storage unit over a looking-aside determination time.

A driver monitoring system disclosed in JP2017-157196A determines whether a driver of a host vehicle is looking at a display screen of a mobile device during travel of the host vehicle, based on an image captured by a camera of the mobile device, and issues a warning when it is determined that the driver is looking at the display screen of the mobile device.

SUMMARY

Under a predetermined condition, such as when level 3 autonomous driving defined by the Society of Automotive Engineers (SAE) is applied to a vehicle, a vehicle may be operating under autonomous driving control without a driver being required to participate in driving. In such a situation, a driver is allowed to perform secondary activities, and does not need to always look around the vehicle. However, in level 3 autonomous driving, a driver may be required to take over driving, depending on circumstances. Thus, even during execution of level 3 autonomous driving, the driver needs to prepare for takeover, and the driver's state is continually monitored.

It may be difficult to detect a driver's state correctly, depending on the condition for capturing the driver's images. When it becomes impossible to detect the driver's state, the driver will be required to take over driving for the sake of safety. However, if a driver who can actually drive is required to take over driving for the reason above, the driver's convenience may decrease, and the driver may feel annoyed.

It is an object of the present disclosure to provide a driver monitor that can determine a driver's state appropriately and prevent unnecessary notification to the driver.

According to an embodiment, a driver monitor is provided. The driver monitor includes a processor configured to: detect orientation of the face of a driver of a vehicle from a plurality of driver images generated in time-series by a camera mounted on the vehicle to take a picture of the driver, determine whether a duration during which the orientation of the driver's face inclines more than a predetermined angle in a yaw direction of the vehicle with respect to a reference direction is not less than a predetermined time threshold, when the vehicle is under autonomous driving control, notify a transition demand for taking over driving of the vehicle to the driver via a notification device when the duration is less than the predetermined time threshold, and omit to notify the transition demand to the driver when the duration is not less than the predetermined time threshold.

The processor of the driver monitor notifies the transition demand to the driver via the notification device, only in the case where the duration is less than the predetermined time threshold and where waking of the driver cannot be confirmed.

In this case, the processor is further configured to detect an eye opening level indicating the degree of opening of the driver's eye, based on the driver images. The processor determines that waking of the driver cannot be confirmed, in the case where the duration is less than the predetermined time threshold and where the processor cannot detect the eye opening level.

The processor determines that the driver is awake, when the driver's face has been oriented to a display provided in the interior of the vehicle for more than a predetermined period.

The processor detects orientation of the driver's body from the driver images, and determines the inclination of the orientation of the driver's face with respect to the reference direction, based on the difference between the orientation of the driver's body and the orientation of the driver's face in the yaw direction.

According to another embodiment, a method for monitoring a driver is provided. The method includes detecting orientation of the face of a driver of a vehicle from a plurality of driver images generated in time-series by a camera mounted on the vehicle to take a picture of the driver; determining whether a duration during which the orientation of the driver's face inclines more than a predetermined angle in a yaw direction of the vehicle with respect to a reference direction is not less than a predetermined time threshold, when the vehicle is under autonomous driving control; notifying a transition demand for taking over driving of the vehicle to the driver via a notification device when the duration is less than the predetermined time threshold; and omitting to notify the transition demand to the driver when the duration is not less than the predetermined time threshold.

According to still another embodiment, a non-transitory recording medium that stores a computer program for monitoring a driver is provided. The computer program includes instructions causing a processor mounted on a vehicle to execute a process including detecting orientation of the face of a driver of the vehicle from a plurality of driver images generated in time-series by a camera mounted on the vehicle to take a picture of the driver; determining whether a duration during which the orientation of the driver's face inclines more than a predetermined angle in a yaw direction of the vehicle with respect to a reference direction is not less than a predetermined time threshold, when the vehicle is under autonomous driving control; notifying a transition demand for taking over driving of the vehicle to the driver via a notification device when the duration is less than the predetermined time threshold; and omitting to notify the transition demand to the driver when the duration is not less than the predetermined time threshold.

The driver monitor according to the present disclosure has an effect of being able to determine the driver's state appropriately and prevent unnecessary notification to the driver.

BRIEF DESCRIPTION OF DRAWINGS

FIG. 3 is a functional block diagram of a processor of the ECU, related to a driver monitoring process.

FIG. 4A is a schematic diagram illustrating the driver monitoring process according to the embodiment.

FIG. 4B is a schematic diagram illustrating the driver monitoring process according to the embodiment.

FIG. 5 is an operation flowchart of a vehicle control process including the driver monitoring process and executed by the processor of the ECU of a vehicle.

DESCRIPTION OF EMBODIMENTS

A driver monitor, a method for monitoring a driver executed by the driver monitor, and a computer program for monitoring a driver will now be described with reference to the attached drawings. The driver monitor detects the orientation of the face of a driver of a vehicle from time-series driver images generated by a camera mounted on the vehicle to take pictures of the driver. In addition, the driver monitor determines whether a duration during which the orientation of the driver's face inclines more than a predetermined angle in a yaw direction of the vehicle with respect to a reference direction is not less than a predetermined time threshold, when the vehicle is under autonomous driving control. The driver monitor notifies a transition demand for taking over driving of the vehicle (hereafter simply a "transition demand") to the driver via a notification unit when the duration is less than the predetermined time threshold, and omits to notify the transition demand to the driver when the duration is not less than the predetermined time threshold.

Figure 1:
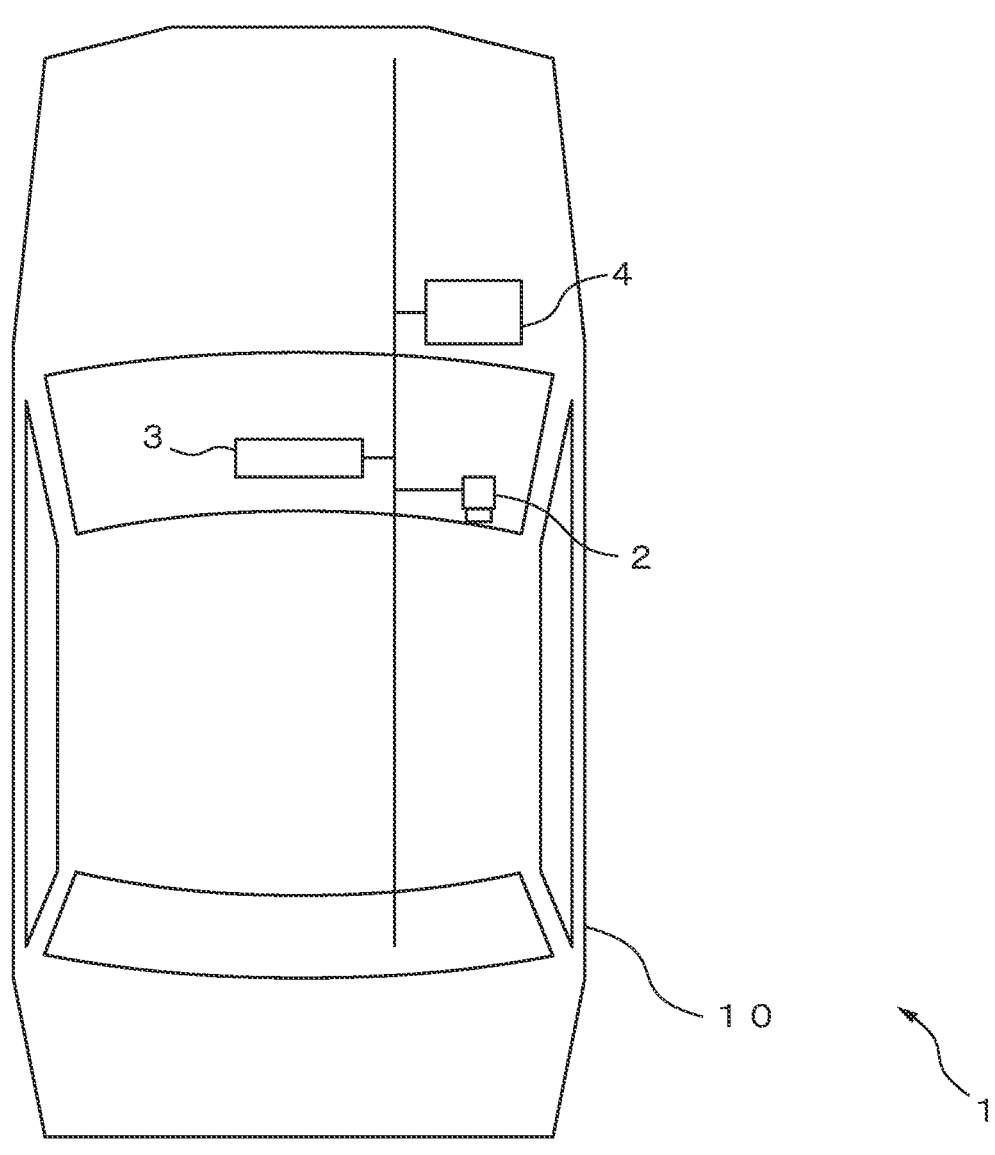
FIG. 1 schematically illustrates the configuration of a vehicle control system including a driver monitor.

FIG. 1 schematically illustrates the configuration of a vehicle control system including the driver monitor. In the present embodiment, the vehicle control system 1, which is mounted on a vehicle 10 and controls the vehicle 10, includes a driver monitoring camera 2, a notification device 3, and an electronic control unit (ECU) 4, which is an example of the driver monitor. The driver monitoring camera 2 and the notification device 3 are communicably connected to the ECU 4 via an in-vehicle network conforming to a communication standard, such as a controller area network. The vehicle control system 1 may include a vehicle exterior camera (not illustrated) that takes pictures of a region around the vehicle 10 to generate images representing the surrounding region, and further include a distance sensor (not illustrated) that measures the distances from the vehicle 10 to objects around the vehicle 10, such as LiDAR or radar. The vehicle control system 1 may further include a measurement device (not illustrated) for measuring the position of the vehicle 10 on the basis of signals from satellites, such as a GPS receiver; a navigation device (not illustrated) for searching for a planned travel route to a destination; and a storage device (not illustrated) that stores map information referred to in autonomous driving control of the vehicle 10.

The vehicle control system 1 can control the vehicle 10 at level 3 of driving control defined by SAE, i.e., at a driving control level in which the driver is not required to operate the accelerator, brake, or steering or to look around the vehicle. The ECU 4 executes a driver monitoring process while controlling the vehicle 10 at level 3 of driving control. However, the scope of application of the driver monitoring process according to the present disclosure is not limited to this example. The ECU 4 may execute the driver monitoring process in the case where the driver's secondary activities are allowed during autonomous driving control and where the vehicle 10 is controlled at a driving control level at which the driver may be required to take over driving by the ECU 4.

The driver monitoring camera 2, which is an example of an image capturing unit, includes a two-dimensional detector constructed from an array of optoelectronic transducers, such as CCD or C-MOS, having sensitivity to visible or infrared light and a focusing optical system that forms an image of a target region on the two-dimensional detector. The driver monitoring camera 2 may further include a light source, such as an infrared LED, for illuminating the driver. The driver monitoring camera 2 is mounted in the interior of the vehicle 10 so that the head of the driver sitting on the driver's seat of the vehicle 10 may be included in the target region, i.e., so that pictures of the driver's head can be taken. For example, the driver monitoring camera 2 is mounted on or near an instrument panel or steering and oriented to the driver. The driver monitoring camera 2 takes a picture of the driver every predetermined capturing period (e.g., $\frac{1}{30}$ to $\frac{1}{10}$ seconds), and generates an image representing the driver (hereafter "driver image"). A driver image obtained by the driver monitoring camera 2 may be a color or grayscale image. Every time a driver image is generated, the driver monitoring camera 2 outputs the generated driver image to the ECU 4 via the in-vehicle network.

The notification device 3, which is an example of the notification unit, is provided in the interior of the vehicle 10, and gives predetermined notification, such as notification of a transition demand, to the driver by light, voice, vibration, or display of text or an image. To achieve this, the notification device 3 includes, for example, at least one of a speaker, a light source, a vibrator, or a display. When predetermined notification to the driver is received from the ECU 4, the notification device 3 gives the predetermined notification to the driver by a voice from the speaker, lighting up or blinking of the light source, vibration of the vibrator, or displaying a message representing the predetermined notification on the display.

The ECU 4 controls driving of the vehicle 10 according to a driving control level applied to the vehicle 10. In addition, the ECU 4 monitors the driver, based on driver images received from the driver monitoring camera 2. When waking of the driver cannot be confirmed, the ECU 4 notifies a transition demand to the driver via the notification device 3.

Figure 2:
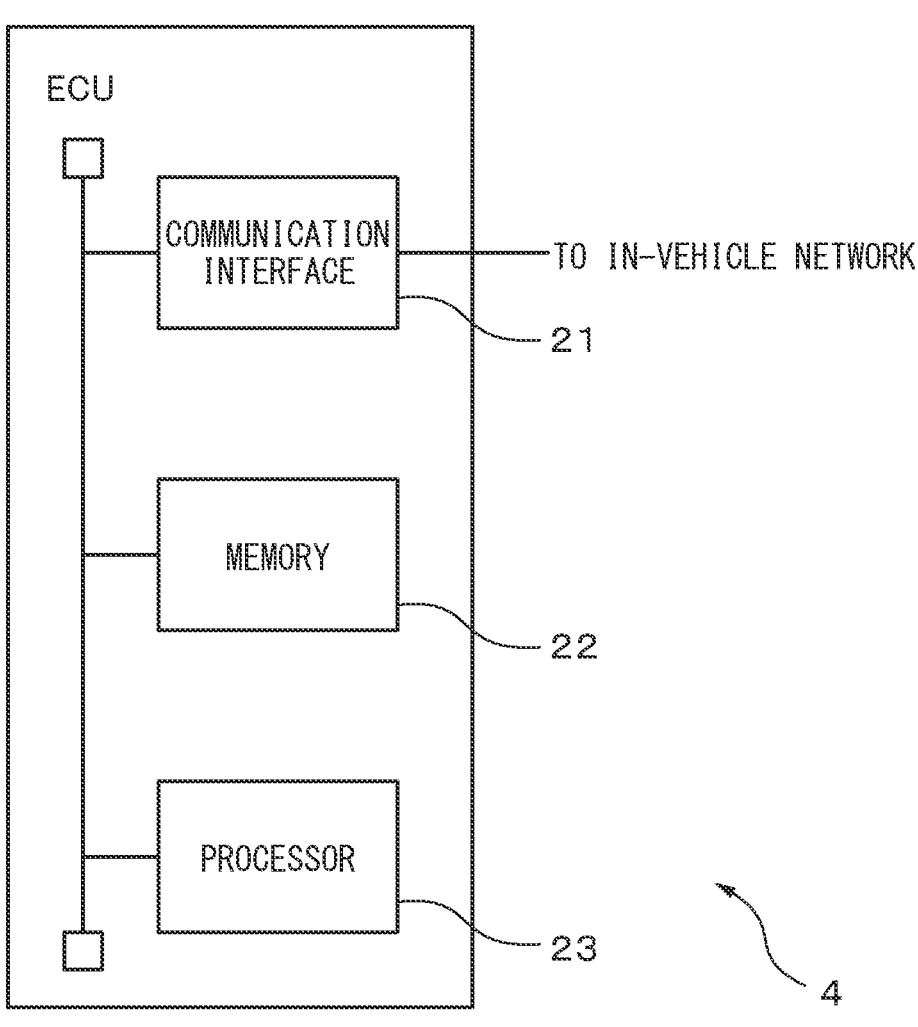
FIG. 2 illustrates the hardware configuration of an ECU, which is an example of the driver monitor.

FIG. 2 illustrates the hardware configuration of the ECU 4. As illustrated in FIG. 2, the ECU 4 includes a communication interface 21, a memory 22, and a processor 23. The communication interface 21, the memory 22, and the processor 23 may be configured as separate circuits or a single integrated circuit.

The communication interface 21 includes an interface circuit for connecting the ECU 4 to the in-vehicle network. Every time a driver image is received from the driver monitoring camera 2, the communication interface 21 passes the received driver image to the processor 23. Further, when information to be notified to the driver via the notification device 3, such as a transition demand, is received from the processor 23, the communication interface 21 outputs the information to the notification device 3.

The memory 22, which is an example of a storage unit, includes, for example, volatile and nonvolatile semiconductor memories, and stores various algorithms and various types of data used in the driver monitoring process executed by the processor 23 of the ECU 4. For example, the memory 22 stores various parameters used for detecting the driver's posture. In addition, the memory 22 temporarily stores driver images and various types of data generated during the driver monitoring process. Further, the memory 22 stores various parameters and various types of data used for driving control of the vehicle 10. Such data includes images generated by the vehicle exterior camera, ranging signals generated by the distance sensor, positioning signals indicating the position of the vehicle 10 generated by the GPS receiver, a planned travel route generated by the navigation device, and map information.

The processor 23 includes one or more central processing units (CPUs) and a peripheral circuit thereof. The processor 23 may further include another operating circuit, such as a logic-arithmetic unit, an arithmetic unit, or a graphics processing unit. The processor 23 executes a control process for driving the vehicle including the driver monitoring process at predetermined intervals.

Figure 3:
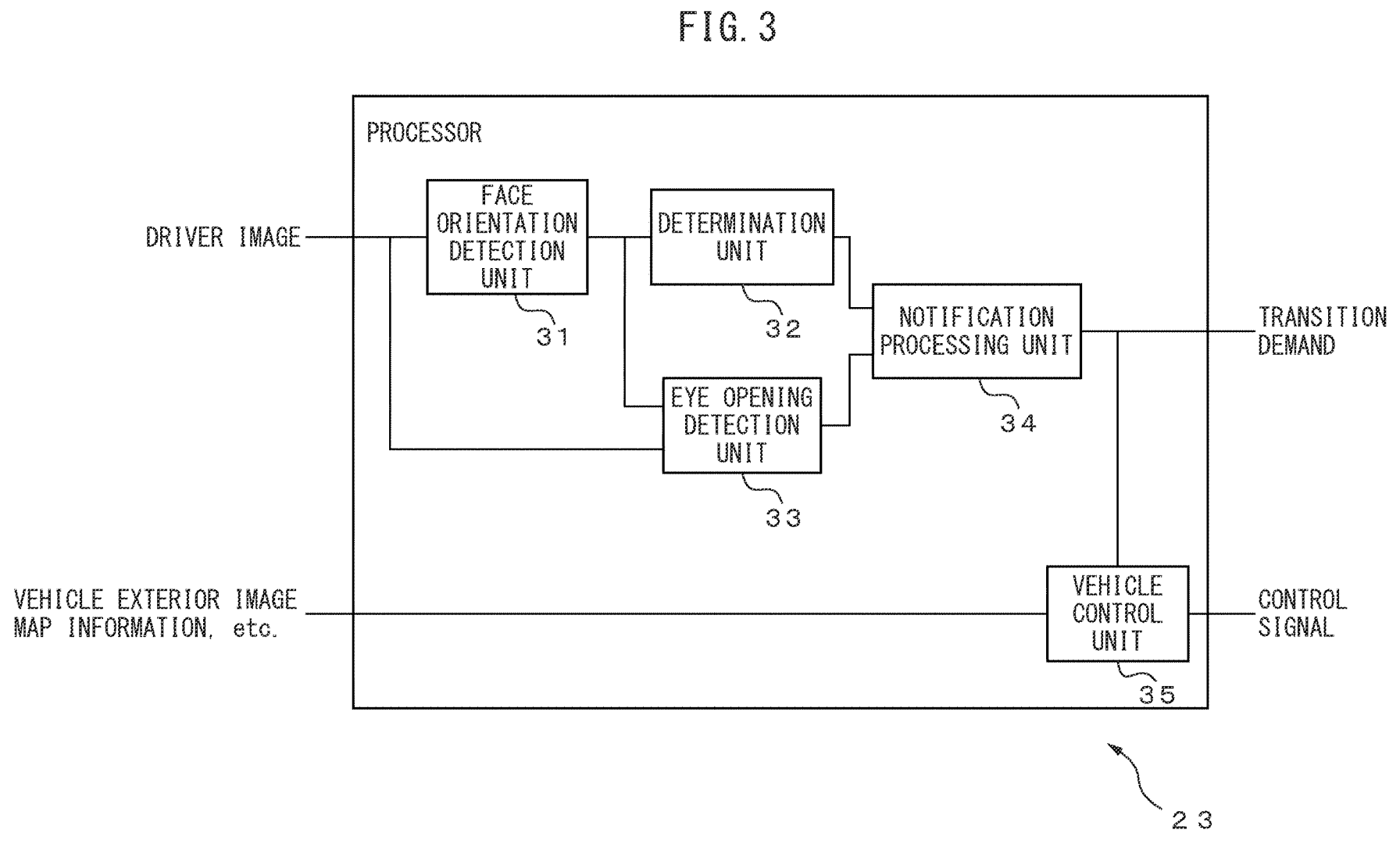

FIG. 3 is a functional block diagram of the processor 23, related to the control process for driving the vehicle including the driver monitoring process. The processor 23 includes a face orientation detection unit 31, a determination unit 32, an eye opening detection unit 33, a notification processing unit 34, and a vehicle control unit 35. These units included in the processor 23 are functional modules, for example, implemented by a computer program executed by the processor 23, or may be dedicated operating circuits provided in the processor 23. Of these units included in the processor 23, processing executed by the face orientation detection unit 31, the determination unit 32, the eye opening detection unit 33, and the notification processing unit 34 corresponds to the driver monitoring process.

The face orientation detection unit 31 detects the orientation of the driver's face at predetermined intervals from the latest driver image received by the ECU 4 from the driver monitor camera 2.

For example, the face orientation detection unit 31 inputs the driver image into a classifier that has been trained to detect a driver's face from an image, thereby detecting a region in the driver image representing the driver's face (hereafter a "face region"). As such a classifier, the face orientation detection unit 31 can use, for example, a DNN having architecture of a CNN type or an AdaBoost classifier. From the face region of the driver image, the face orientation detection unit 31 further detects feature points of the driver's face, such as the inner and outer canthi, the tip of the nose, and the corners of the mouth. Specifically, the face orientation detection unit 31 inputs the face region into a classifier that has been trained to detect feature points of a face represented in an image, thereby detecting the facial feature points. As such a classifier, the face orientation detection unit 31 can use, for example, a DNN having architecture of a CNN type, a support vector machine, or an AdaBoost classifier. The classifier for detecting a face region may be integrated with the classifier for detecting facial feature points. In this case, the face orientation detection unit 31 can detect a face region and individual facial feature points by inputting a driver image into the classifier. Alternatively, the face orientation detection unit 31 may detect individual feature points of the driver's face from the face region by template matching of the face region with templates representing facial feature points or in accordance with another technique to detect facial feature points.

The face orientation detection unit 31 fits the detected individual facial feature points into a three-dimensional face model representing the three-dimensional shape of a face. The face orientation detection unit 31 then detects the orientation of the face of the three-dimensional face model best fitted by the feature points as the orientation of the driver's face. The face orientation detection unit 31 may detect the orientation of the driver's face, based on a driver image, in accordance with another technique to determine the orientation of a face represented in an image.

When no face region is detected from the driver image, the face orientation detection unit 31 determines that detection of the orientation of the driver's face has failed. When a face region is detected but a predetermined number of facial feature points are not detected, the face orientation detection unit 31 also determines that detection of the orientation of the driver's face has failed.

Every time the orientation of the driver's face is detected from a driver image, the face orientation detection unit 31 notifies the determination unit 32 of the result of detection of the orientation of the driver's face and the eye opening detection unit 33 of information indicating the face region (e.g., coordinates of the upper left and lower right corners of the face region). When detection of a face region or a face orientation has failed, the face orientation detection unit 31 notifies the failure to the determination unit 32, the eye opening detection unit 33, and the notification processing unit 34.

The determination unit 32 determines whether a duration during which the orientation of the driver's face inclines more than a predetermined angle in a yaw direction of the vehicle 10, i.e., in a plane parallel to the road surface, with respect to a reference direction is not less than a predetermined time threshold, when the vehicle 10 is under autonomous driving control. The reference direction may be the direction to the front of the vehicle 10. In the case where the driver monitoring camera 2 is provided near the instrument panel or on the steering, the reference direction may be the direction to the driver monitoring camera. The predetermined angle may be, for example, 20 to 30 degrees. The predetermined time threshold may be, for example, several seconds to a dozen or so seconds. In the following, a duration during which the orientation of the driver's face in the yaw direction inclines more than the predetermined angle with respect to the reference direction may be referred to simply as "duration."

Every time the result of detection of the orientation of the driver's face is received from the face orientation detection unit 31, the determination unit 32 calculates the angular difference between the orientation of the driver's face in the yaw direction and the reference direction. When the angular difference exceeds the predetermined angle, the determination unit 32 starts measuring the duration. When the angular difference between the orientation of the driver's face in the yaw direction and the reference direction falls below the predetermined angle after the start of measurement of the duration, the determination unit 32 finishes measuring the duration. Alternatively, when notified of failure to detect a face region or a face orientation, the determination unit 32 may finish measuring the duration. When the duration at the finishing time of measurement thereof is less than the predetermined time threshold, the determination unit 32 notifies the notification processing unit 34 that the duration during which the orientation of the driver's face in the yaw direction inclines more than the predetermined angle with respect to the reference direction is less than the predetermined time threshold. When the duration reaches the predetermined time threshold during measurement thereof, the determination unit 32 notifies the notification processing unit 34 that the duration during which the orientation of the driver's face in the yaw direction inclines more than the predetermined angle with respect to the reference direction is not less than the predetermined time threshold.

Every time information indicating a face region is received from the face orientation detection unit 31, the eye opening detection unit 33 determines whether the driver's eye opening level can be detected from the driver image including the face region. The eye opening detection unit 33 itself may detect a face region by inputting a driver image into a classifier for detecting a face region. For example, the eye opening detection unit 33 applies an edge detection filter, such as a Sobel filter, to detect edge pixels in the face region. The eye opening detection unit 33 then detects lines of edge pixels extending in a substantially horizontal direction, and detects, for each of the left and right eyes, such two lines separated vertically in an area of the face region where the eye is supposed to lie, as the upper and lower eyelids of the eye.

When the upper and lower eyelids of at least one of the driver's eyes are detected from the face region, the eye opening detection unit 33 determines that the eye opening level has been detected. The eye opening detection unit 33 then detects the ratio of the maximum space between the upper and lower eyelids to the length of the line connecting both ends of the upper or lower eyelid of the eye as the eye opening level. Instead of the length of the line connecting both ends of the upper or lower eyelid of the eye, the eye opening detection unit 33 may use the length of the line connecting the inner and outer canthi detected by the face orientation detection unit 31. When the upper and lower eyelids of both the driver's eyes are detected, the eye opening detection unit 33 may determine an average of the ratios calculated for the respective eyes as the eye opening level. The eye opening detection unit 33 may correct the calculated eye opening level, depending on the orientation of the driver's face. For example, the distance between the inner and outer canthi looks shorter in a driver image as the angle formed between the orientation of the driver's face in the yaw direction and the direction of the optical axis of the driver monitoring camera 2 is greater. Thus the eye opening detection unit 33 may correct the eye opening level so as to decrease the eye opening level as the angle formed between the orientation of the driver's face in the yaw direction and the direction of the optical axis of the driver monitoring camera 2 increases. Further, the space between the upper and lower eyelids looks narrower in a driver image as the angle formed between the orientation of the driver's face in the pitch direction and the direction of the optical axis of the driver monitoring camera 2 is greater. Thus the eye opening detection unit 33 may correct the eye opening level so as to increase the eye opening level as the angle formed between the orientation of the driver's face in the pitch direction and the direction of the optical axis of the driver monitoring camera 2 increases.

When one or both of the upper and lower eyelids cannot be detected for any of the driver's eyes, the eye opening detection unit 33 determines that the eye opening level cannot be detected.

The eye opening detection unit 33 may detect eye regions respectively representing the driver's left and right eyes from the face region, and detect the eye opening level, based on the detected eye regions. For example, the eye opening detection unit 33 inputs the face region into a classifier that has been trained to detect eye regions, thereby detecting eye regions of the driver's left and right eyes. As such a classifier, the eye opening detection unit 33 can use a DNN having architecture of a CNN type. When an eye region of at least one of the driver's eyes is detected, the eye opening detection unit 33 detects the ratio of the vertical length of the detected eye region to the horizontal length thereof as the eye opening level. When eye regions of both the driver's eyes are detected, the eye opening detection unit 33 may determine an average of the ratios of the vertical length of the eye region to the horizontal length thereof calculated for the respective eyes as the eye opening level. In this case also, the eye opening detection unit 33 may correct the calculated eye opening level, depending on the orientation of the driver's face, as in the above-described example.

When an eye region cannot be detected for any of the driver's eyes, the eye opening detection unit 33 determines that the eye opening level cannot be detected.

The eye opening detection unit 33 notifies the notification processing unit 34 of the result of determination whether the eye opening level has been detected. When the eye opening level has been detected, the eye opening detection unit 33 further notifies the notification processing unit 34 of the detected eye opening level.

The notification processing unit 34 executes a predetermined notification process, based on the result of detection of the orientation of the driver's face. In the present embodiment, the notification processing unit 34 notifies a transition demand to the driver via the notification device 3 only when the duration during which the orientation of the driver's face inclines more than the predetermined angle in the yaw direction of the vehicle with respect to the reference direction is less than the predetermined time threshold. In particular, the notification processing unit 34 notifies a transition demand to the driver in the case where the duration is less than the predetermined time threshold and where waking of the driver cannot be confirmed. The case where the inclination of the orientation of the driver's face in the yaw direction with respect to the reference direction is less than the predetermined angle is also included in the case where the duration is less than the predetermined time threshold. In other words, the notification processing unit 34 also notifies a transition demand to the driver in the case where the inclination of the orientation of the driver's face in the yaw direction with respect to the reference direction is less than the predetermined angle and where waking of the driver cannot be confirmed. In contrast, when the duration is not less than the predetermined time threshold, the notification processing unit 34 omits to notify a transition demand to the driver. This is because it is difficult for the driver to keep his/her face inclined in the yaw direction unless the driver is awake.

When the result of determination that the eye opening level cannot be detected is received from the eye opening detection unit 33, the notification processing unit 34 determines that waking of the driver cannot be confirmed. This is because it is uncertain how wide the driver's eyes are open, when the eye opening level cannot be detected.

The notification processing unit 34 may determine that waking of the driver cannot be confirmed, when notified by the face orientation detection unit 31 that detection of a face region or the orientation of the driver's face has failed.

In addition, the notification processing unit 34 may determine whether the driver is awake, based on time-varying changes in the eye opening level. For example, the notification processing unit 34 determines that the driver is not awake, when the period during which the eye opening level is less than a predetermined eye opening threshold is not shorter than a predetermined time; and determines that the driver is awake, when the period is shorter than the predetermined time. When it is determined that the driver is not awake, the notification processing unit 34 may notify a transition demand to the driver via the notification device 3.

The notification processing unit 34 may determine whether the driver's face is oriented to a display provided in the interior of the vehicle 10. The display may be a display included in the notification device 3 or the navigation device. For example, when the orientation of the driver's face is within a predetermined angle range corresponding to the direction to the display, the notification processing unit 34 determines that the driver's face is oriented to the display. When the driver's face has been oriented to the display for more than a predetermined period, the notification processing unit 34 may determine that the driver is awake. Thus, in this case, the notification processing unit 34 does not give notification of a transition demand. The notification processing unit 34 may determine whether the driver is awake, depending on whether the driver's face is oriented to the display, only when the ECU 4 is notified by the display or a controller of the display that certain content is displayed on the display.

When notifying a transition demand to the driver, the notification processing unit 34 causes the speaker included in the notification device 3 to output a voice signal for requiring the driver to take over driving. Alternatively, the notification processing unit 34 causes the display included in the notification device 3 to display a message or an icon for requiring the driver to take over driving. Alternatively, the notification processing unit 34 causes the vibrator included in the notification device 3 to vibrate or the light source included in the notification device 3 to light up or blink in a mode indicating that the driver is required to take over driving. In the case where the notification device 3 includes two or more of the above-mentioned devices, the notification processing unit 34 may notify a transition demand to the driver with all or some of the two or more devices. Before notification of a transition demand, the notification processing unit 34 may notify the driver of a warning to wake him/her, via the notification device 3.

When the driver starts driving the vehicle 10 after notification of a transition demand to the driver, the notification processing unit 34 stops executing the process to give notification of a transition demand. Alternatively, when the above-described condition for giving notification of a transition demand becomes no longer satisfied after notification of a transition demand to the driver, the notification processing unit 34 stops executing the process to give notification of a transition demand. The notification processing unit 34 determines that the driver has started driving the vehicle 10, when hold of the steering wheel by the driver is sensed via a touch sensor (not illustrated) provided in the steering and the fact that the driver has faced the front of the vehicle 10 is sensed by the face orientation detection unit 31. Alternatively, the notification processing unit 34 may determine that the driver has started driving the vehicle 10, when the fact that the driver has faced the front of the vehicle 10 is sensed by the face orientation detection unit 31 and operation of an accelerator pedal or a brake pedal is sensed. When it is determined that the driver has started driving the vehicle 10, the notification processing unit 34 notifies the determination to the vehicle control unit 35.

FIGS. 4A and 4B are schematic diagrams illustrating the driver monitoring process according to the present embodiment. In FIGS. 4A and 4B, the horizontal axes represent the passage of time. In FIGS. 4A and 4B, a driver 400 is illustrated as an outline of the head viewed from the top of the head.

In the example illustrated in FIG. 4A, duration P1 during which the angular difference θ between the face orientation of the driver 400 in the yaw direction and a reference direction is not less than a predetermined angle Tha is not shorter than a time threshold Th1. Hence the driver is assumed to be awake, and is not notified of a transition demand.

In contrast, in the example illustrated in FIG. 4B, duration P2 during which the angular difference θ between the face orientation of the driver 400 in the yaw direction and a reference direction is not less than the predetermined angle Tha is shorter than the time threshold Th1. Hence the driver is notified of a transition demand unless waking of the driver is confirmed at the end of the duration P2 or thereafter.

The vehicle control unit 35 controls the vehicle 10 according to a driving control level applied to the vehicle 10, until the driver starts driving. When the driving control level applied to the vehicle 10 is such that the driver does not participate in driving the vehicle 10, the vehicle control unit 35 controls the vehicle 10 to travel along a host vehicle lane on which the vehicle 10 is traveling. To achieve this, the vehicle control unit 35 detects a lane line that divides the host vehicle lane and an adjacent lane as well as moving objects, such as other traveling vehicles around the vehicle 10, from an image generated by the vehicle exterior camera. The vehicle control unit 35 compares the detected lane line with the map information to estimate the position and orientation of the vehicle 10. Based on the result of estimation of the position and orientation of the vehicle 10 and the results of detection of individual moving objects around the vehicle 10, the vehicle control unit 35 controls the vehicle 10 so that the vehicle 10 does not collide with any of the moving objects and travels along the host vehicle lane.

When notified by the notification processing unit 34 that the driver has started driving the vehicle 10, the vehicle control unit 35 transfers control of the vehicle 10 to the driver and thereafter controls the vehicle 10 according to the driver's operation. The vehicle control unit 35 may control the vehicle 10 so that the vehicle 10 makes an emergency stop, in the case where the driver does not start driving the vehicle 10 and the condition for giving notification of a transition demand is still satisfied even after a predetermined time from the notification of a transition demand to the driver by the notification processing unit 34. Specifically, the vehicle control unit 35 may stop the vehicle 10 after moving the vehicle 10 to a road shoulder, based on the result of estimation of the position and orientation of the vehicle 10, the results of detection of individual moving objects around the vehicle 10, and the map information.

FIG. 5 is an operation flowchart of a vehicle control process including the driver monitoring process and executed by the processor 23. While the vehicle 10 is under autonomous driving control, the processor 23 executes the vehicle control process at predetermined intervals in accordance with the operation flowchart described below.

The face orientation detection unit 31 of the processor 23 detects the orientation of the driver's face, based on a driver image (step S101). The eye opening detection unit 33 of the processor 23 detects the driver's eye opening level, based on the driver image (step S102).

The determination unit 32 of the processor 23 determines whether duration P during which the orientation of the driver's face in the yaw direction inclines more than a predetermined angle with respect to a reference direction is not less than a predetermined time threshold Th1 (step S103). When the duration P is not less than the predetermined time threshold Th1 (Yes in step S103), the notification processing unit 34 of the processor 23 determines not to notify a transition demand to the driver (step S104). The vehicle control unit 35 of the processor 23 then continues autonomous driving control of the vehicle 10 (step S105).

When the duration P is less than the predetermined time threshold Th1 (No in step S103), the notification processing unit 34 determines whether the eye opening level is detected by the eye opening detection unit 33 (step S106). When the eye opening level is not detected (No in step S106), the notification processing unit 34 determines that waking of the driver cannot be confirmed, and notifies a transition demand to the driver via the notification device 3 (step S107). The vehicle control unit 35 then transfers control of the vehicle 10 to the driver (step S108). When the eye opening level is detected (Yes in step S106), the notification processing unit 34 determines whether time-varying changes in the eye opening level indicate waking of the driver (step S109). When it is determined that waking of the driver is indicated (Yes in step S109), the processor 23 executes the processing of step S104 and the subsequent step. When waking of the driver cannot be confirmed (No in step S109), the processor 23 executes the processing of step S107 and the subsequent step.

After step S105 or S108, the processor 23 terminates the vehicle control process. The processing of step S102 may be executed in parallel with or before that of step S101. The processing of step S102 may be executed in parallel with or after that of step S103.

As has been described above, the driver monitor determines whether a duration during which the orientation of the driver's face inclines more than a predetermined angle in a yaw direction of the vehicle with respect to a reference direction is not less than a predetermined time threshold, when the vehicle is under autonomous driving control. When the duration is not less than the predetermined time threshold, the driver monitor omits to notify a transition demand to the driver, assuming that the driver is awake. In this way, the driver monitor can determine whether the driver is awake accurately by checking the orientation of the driver's face in the yaw direction. Thus the driver monitor can determine the driver's state appropriately and prevent unnecessary notification to the driver.

According to a modified example, the face orientation detection unit 31 may determine the orientation of the driver's face in the yaw direction as the difference between the orientations of the driver's body and face. This is because, in the case where the driver is inclining his/her body in the same direction as the face orientation, the driver may not be twisting his/her neck much, may be maintaining a relaxed posture, and may not be awake even when the driver is inclining his/her face with respect to the direction to the front of the vehicle 10.

In this modified example, the classifier that detects a face region from a driver image is trained in advance so as to also detect the driver's left and right shoulders, from a driver image. The face orientation detection unit 31 detects the driver's left and right shoulders as well as a face region by inputting a driver image into the classifier. The face orientation detection unit 31 then determines the difference between the vertical positions of the left and right shoulders in the driver image, and refers to a reference table representing the relationship between the difference and the orientation of the body, thereby detecting the orientation of the driver's body. More specifically, a shoulder closer to the driver monitoring camera 2 is represented closer to the upper edge in driver images. Thus, in driver images, the position of a shoulder opposite to the side where the driver's body faces is higher than that of the other shoulder on the side where the driver's body faces. For example, when the driver's body faces left with respect to the driver monitoring camera 2, the right shoulder is located higher than the left shoulder in driver images. Further, as the body inclines more to the left, the difference in height between the right and left shoulders in driver images is greater. Thus, the orientation of the driver's body is estimated, based on the difference in height between the left and right shoulders in a driver image. Such a reference table is prestored in the memory 22. Alternatively, the classifier that detects a face region from a driver image may be trained in advance so as to detect the orientation of the driver's body directly from a driver image. In this case, the face orientation detection unit 31 can detect the orientation of the driver's body as well as a face region by inputting a driver image into the classifier.

When the orientation of the driver's body is detected, the face orientation detection unit 31 uses the difference between the orientation of the driver's body and the orientation of the driver's face in the yaw direction detected on the basis of a face region as a new orientation of the driver's face in the yaw direction. For example, assume that, based on a face region, the orientation of the driver's face in the yaw direction is detected as a 30-degree angle to the left with respect to the direction to the front of the vehicle 10, and the orientation of the driver's body is detected as a 10-degree angle to the left with respect to the direction to the front of the vehicle 10. In this case, the face orientation detection unit 31 detects the orientation of the driver's face in the yaw direction as 20 degrees to the left.

According to this modified example, since the orientation of the driver's face is detected as the difference between the orientations of the driver's body and face, the driver monitor can determine waking of the driver more appropriately, based on the orientation of the driver's face. As a result, the driver monitor can determine whether to notify a transition demand to the driver more appropriately.

According to another modified example, the notification processing unit 34 may refer to the orientation of the driver's face in the pitch direction, i.e., in the vertical direction, when determining whether to give notification of a transition demand. In particular, the driver may be bending his/her head down when dozing. Thus, when the orientation of the driver's face in the pitch direction inclines more than a predetermined downward angle to the lower side with respect to the direction to the front of the vehicle 10, the notification processing unit 34 may determine that waking of the driver cannot be confirmed, regardless of the orientation of the driver's face in the yaw direction. In the case where waking of the driver cannot be confirmed, the notification processing unit 34 may notify a transition demand to the driver via the notification device 3 even when the duration during which the orientation of the driver's face in the yaw direction inclines more than the predetermined angle with respect to the reference direction is not less than the predetermined time threshold. In this modified example also, the driver monitor can determine whether to notify a transition demand to the driver more appropriately.

According to still another modified example, the notification processing unit 34 may omit to notify a transition demand to the driver and may make autonomous driving control continue, when the duration during which the orientation of the driver's face in the yaw direction inclines more than the predetermined angle with respect to the reference direction is less than a predetermined glance determination threshold. The glance determination threshold is set less than the predetermined time threshold, e.g., to 1 to 2 seconds. This prevents notification of a transition demand for the case where the driver only glances in a direction other than the front of the vehicle 10, and thus prevents a decrease in the driver's convenience.

In the above-described embodiment or modified examples, the face orientation detection unit 31 may determine whether the driver is wearing eyeglasses. Only when it is determined that the driver is wearing eyeglasses, the processor 23 may determine whether to notify a transition demand to the driver in accordance with the embodiment or one of the modified examples. When it is determined that the driver is not wearing eyeglasses, the processor 23 may determine whether to give notification of a transition demand, according to the result of determination of waking of the driver based on time-varying changes in the eye opening level. These are based on the following reasons: when the driver is wearing eyeglasses, the eyeglasses may reflect light from the light source included in the driver monitoring camera 2 or from the outside of the vehicle, which may make it difficult to detect the driver's eye opening level from a driver image; in contrast, when the driver is not wearing eyeglasses, the driver's eye opening level can be detected from a driver image relatively easily, enabling accurate determination of waking of the driver based on the eye opening level. To determine whether the driver is wearing eyeglasses, the face orientation detection unit 31 may input a face region into a classifier that has been trained to determine the presence or absence of eyeglasses on the basis of a face region. As such a classifier, the face orientation detection unit 31 can use, for example, a DNN having architecture of a CNN type.

The computer program for achieving the functions of the processor 23 of the ECU 4 according to the embodiment or modified examples may be provided in a form recorded on a computer-readable portable storage medium, such as a semiconductor memory, a magnetic medium, or an optical medium.

As described above, those skilled in the art may make various modifications according to embodiments within the scope of the present disclosure.

What is claimed is:

1. A driver monitor comprising:
a processor configured to:
detect orientation of a face of a driver of a vehicle from a plurality of driver images generated in time-series by a camera mounted on the vehicle to take a picture of the driver,
determine whether a duration during which the orientation of the face of the driver inclines more than a predetermined angle in a yaw direction of the vehicle with respect to a reference direction is not less than a predetermined time threshold that was previously set, when the vehicle is under autonomous driving control,
notify a transition demand for taking over driving of the vehicle to the driver via a notification device only in a case where the duration is less than the predetermined time threshold and where waking of the driver cannot be confirmed, and
omit to notify the transition demand to the driver when the duration is not less than the predetermined time threshold.

2. The driver monitor according to claim 1, wherein the processor is further configured to detect an eye opening level indicating a degree of opening of the driver's eye, based on the driver images, wherein
the processor determines that waking of the driver cannot be confirmed, in a case where the duration is less than the predetermined time threshold and where the processor cannot detect the eye opening level.

3. The driver monitor according to claim 1, wherein the processor determines that the driver is awake, when the face of the driver has been oriented to a display provided in the interior of the vehicle for more than a predetermined period.

4. The driver monitor according to claim 1, wherein the processor detects orientation of the driver's body from the driver images, and determines the inclination of the orientation of the face of the driver with respect to the reference direction, based on a difference between the orientation of the driver's body and the orientation of the face of the driver in the yaw direction.

5. A method for monitoring a driver, comprising:
detecting orientation of a face of a driver of a vehicle from a plurality of driver images generated in time-series by a camera mounted on the vehicle to take a picture of the driver;
determining whether a duration during which the orientation of the face of the driver inclines more than a predetermined angle in a yaw direction of the vehicle with respect to a reference direction is not less than a predetermined time threshold that was previously set, when the vehicle is under autonomous driving control;
notifying a transition demand for taking over driving of the vehicle to the driver via a notification device only in a case where the duration is less than the predetermined time threshold and where waking of the driver cannot be confirmed; and
omitting to notify the transition demand to the driver when the duration is not less than the predetermined time threshold.

6. A non-transitory recording medium that stores a computer program for monitoring a driver, the computer program causing a processor mounted on a vehicle to execute a process comprising:
detecting orientation of a face of a driver of the vehicle from a plurality of driver images generated in time-series by a camera mounted on the vehicle to take a picture of the driver;
determining whether a duration during which the orientation of the face of the driver inclines more than a predetermined angle in a yaw direction of the vehicle with respect to a reference direction is not less than a predetermined time threshold that was previously set, when the vehicle is under autonomous driving control;
notifying a transition demand for taking over driving of the vehicle to the driver via a notification device only in a case where the duration is less than the predetermined time threshold and where waking of the driver cannot be confirmed; and omitting to notify the transition demand to the driver when the duration is not less than the predetermined time threshold.

* * * * *